Aug. 28, 1923.
S. MUNSON
CHECKROW PLANTER
Filed April 12, 1920     3 Sheets-Sheet 3
1,466,058
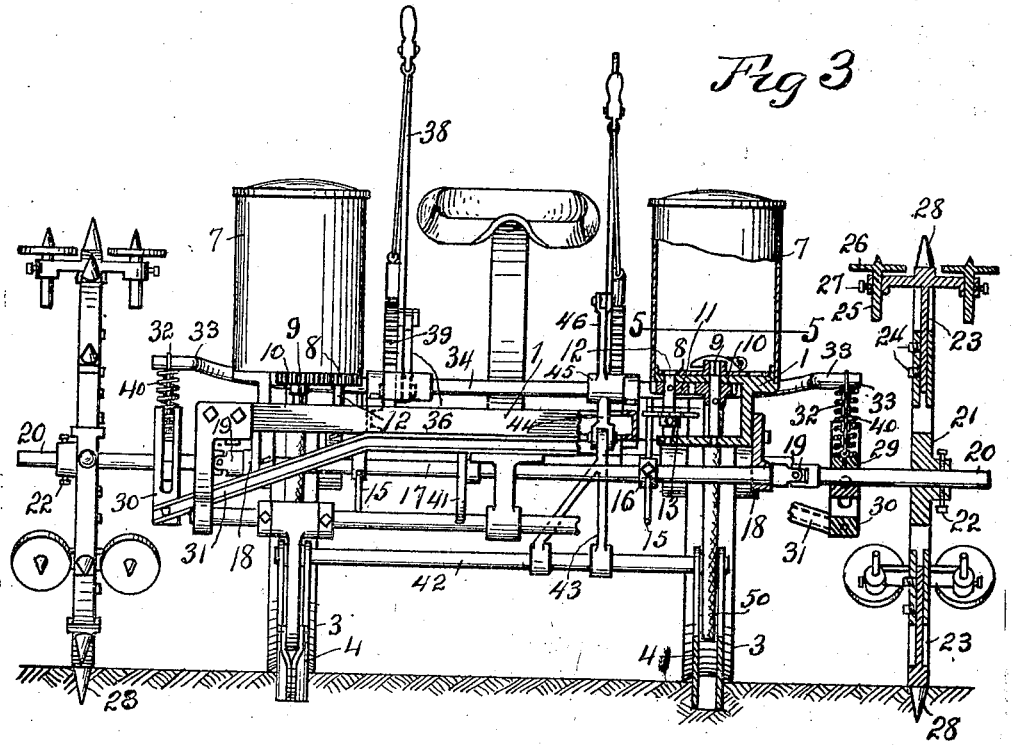
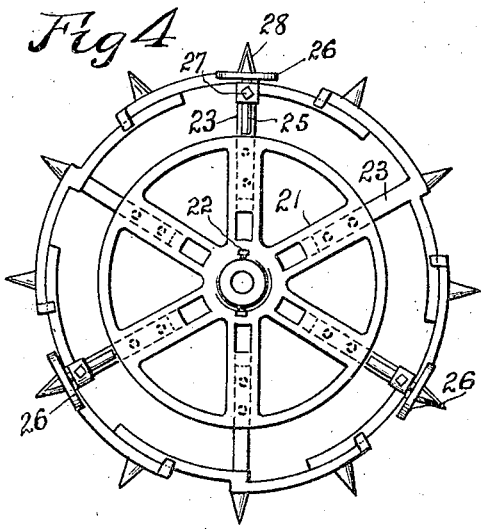
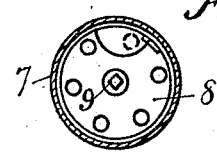
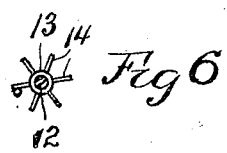
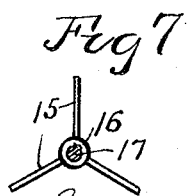
Inventor,
Sweney Munson
By Warren D. House,
His Attorney.
Witness:
R. E. Hamilton Patented Aug. 28, 1923.

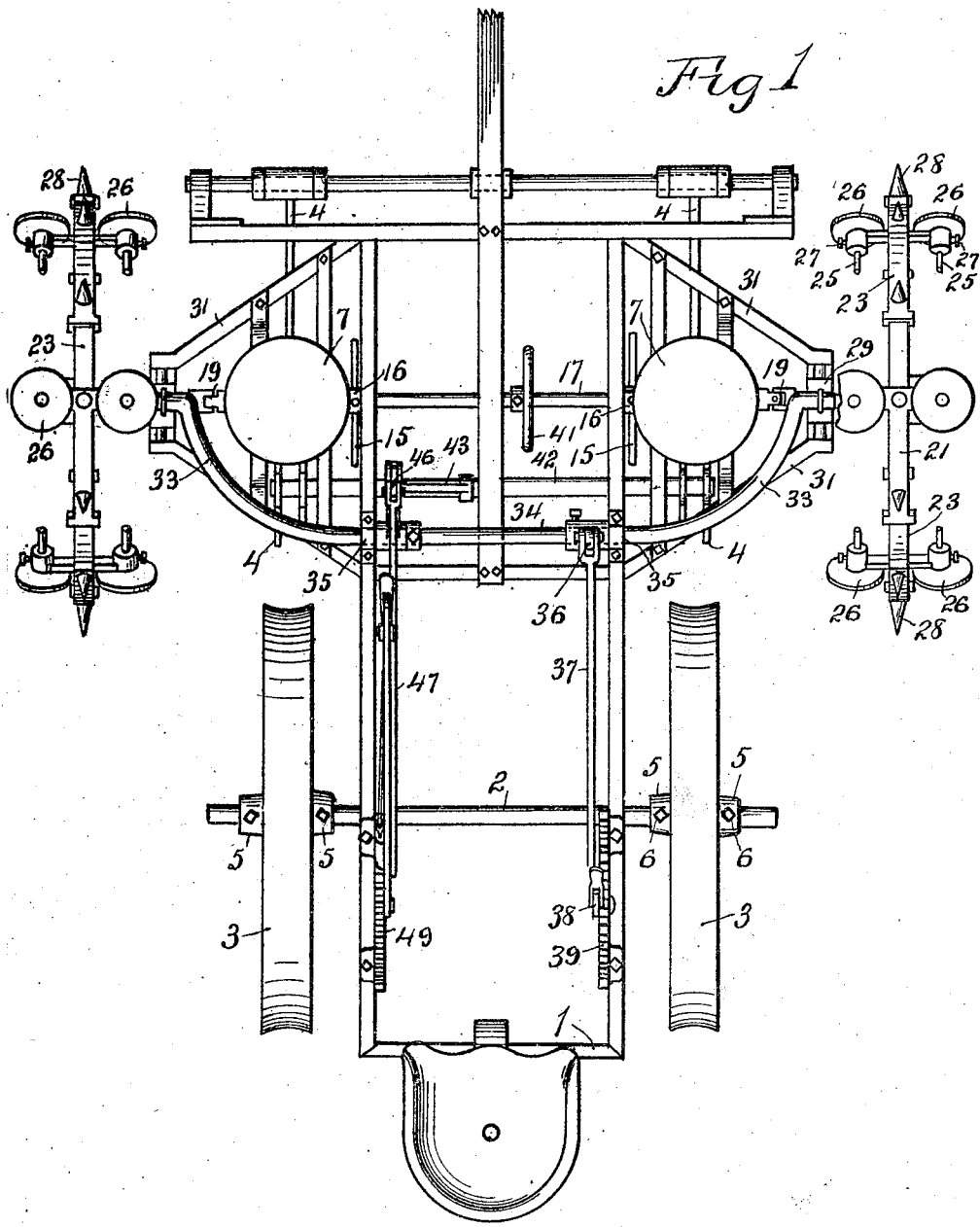

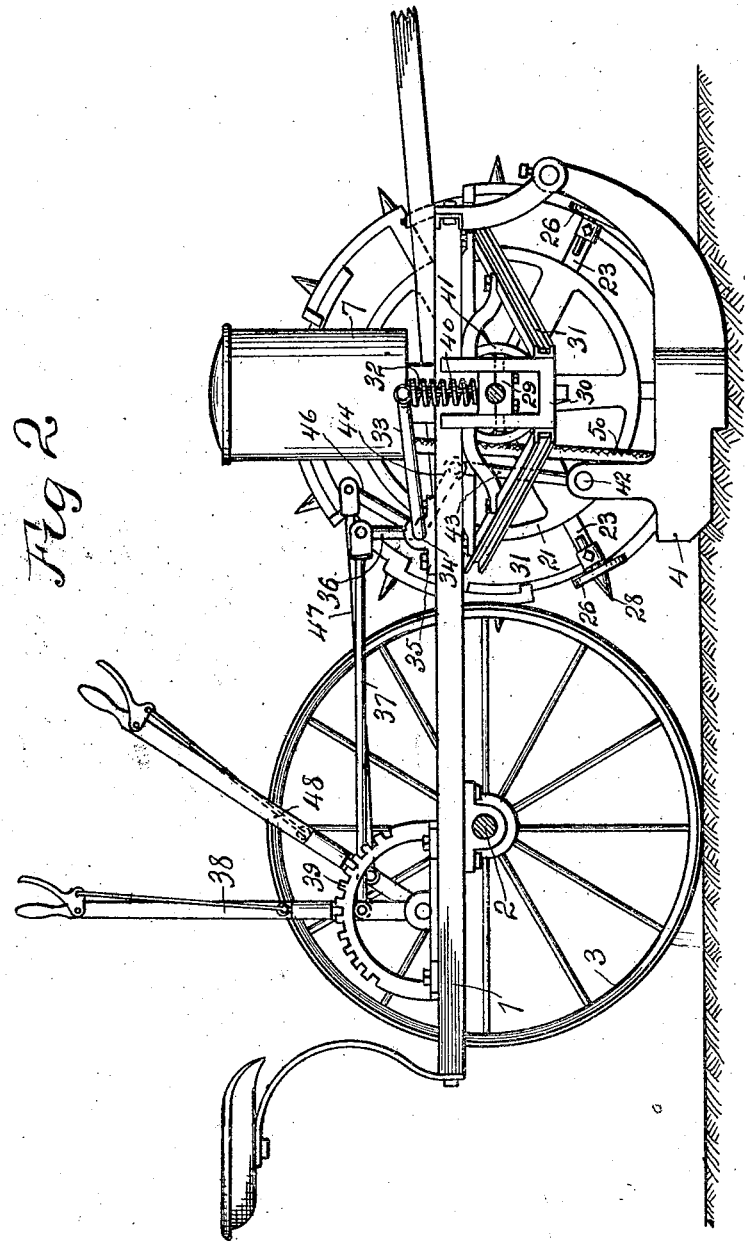

1,466,058

UNITED STATES PATENT OFFICE.

SWENEY MUNSON, OF FOWLER, COLORADO.

CHECKROW PLANTER.

Application filed April 12, 1920. Serial No. 373,353.

*To all whom it may concern:*

Be it known that I, SWENEY MUNSON, a citizen of the United States, residing at Fowler, in the county of Otero and State of Colorado, have invented a certain new and useful Improvement in Checkrow Planters, of which the following is a specification.

My invention relates to improvements in check rower planters.

One of the objects of my invention is to provide novel check row marking means. A further object of my invention is the provision of means by which the marking means operates seed dropping means without the use of a cable.

A further object of my invention is the provision of an expansible and contractible marking wheel arranged to operate seed dropping mechanism and with the use of which the distance between the rows may be varied.

My invention provides still further means by which the ground marking devices may be lifted clear of the ground.

My invention provides still further novel resilient means for forcing the marking into contact with the ground whereby a marking device of relatively light weight can be made to make distinct markings on the ground.

The novel features of my invention are hereinafter fully described and claimed.

In the accompanying drawings, which illustrate the preferred embodiment of my invention, Fig. 1 is a plan view of my improved check rower planter, Fig. 2 is a view of the same, partly in elevation and partly in vertical section.

Fig. 3 is a view, partly in front elevation and partly in vertical section.

Fig. 4 is a side elevation of one of the marking wheels.

Fig. 5 is a cross section on the line 5—5 of Fig. 3.

Fig. 6 is a top view of one of the spoked members which operates the seed dropping mechanism.

Fig. 7 is an end view of one of the spoked members which is attached to the flexible shaft to which the markers are secured.

Similar reference characters designate similar parts in the different views.

1 designates a frame of any suitable type supported on an axle 2, on which are rotatably mounted two wheels 3, having the usual concave tread and adapted to travel respectively in the rear of two planter shoes 4, which are of the usual type. Each of the wheels 3 is mounted between two collars 5, which are longitudinally adjustable on the axle 2, to which they are secured by set screws 6, whereby the wheels 3 may be adjusted toward and from each other in a well known manner.

Mounted on the frame 1 are two seed boxes or seed containers 7 of the ordinary type, each of which is provided with the usual perforated dropping plate 8, Fig. 5, which is secured to the upper end of a vertical rotary shaft 9, rotatably mounted in the frame 1, and having secured to it a spur gear wheel 10, Fig. 3, which meshes with a spur gear wheel 11, which is secured to a rotary vertical shaft 12 mounted in the frame 1, and having secured to it a member 13, having radial spokes 14, Fig. 6, which are adapted to be engaged by radial spokes 15, of a spoked member 16, Fig. 7, and Fig. 3, which is secured rigidly to the intermediate portion of a rotary shaft 17, which is rotatably mounted in bearings 18 which are supported by the frame 1. The shaft 17 is disposed transversely and has its ends respectively connected by universal joints 19, with two end extensions 20, which with the intermediate portion 17 form a flexible shaft.

The central portions 21 of two expansible and contractible marking wheels are respectively rigidly and longitudinally adjustably secured by set screws 22 to the extensions 20.

Radially adjustable in the central portion of each wheel 21, Fig. 4, are radial substantially T-shaped members 23, the arms of each of which are disposed transversely. Set screws 24 mounted in the central portion 21 respectively secure the members 23 in their adjusted positions. Radially adjustable in the laterally extending arms of some of the members 23 are the stems 25 of disk marking shoes 26, which are arranged in pairs and are adapted to make impressions in the ground for the purpose of check rowing. The shoes of each pair are in the same radial plane. The stems 25 are adjustably secured by means of set screws 27. The central portion of the outer end of each member 23 is provided with a conical projection 28, which is adapted to enter the ground to prevent the marking wheel from slipping. The marking wheels in turning rotate the shaft 17 through the intermediacy of its extensions 20.

The extensions 20 are mounted rotatably in boxes 29, Fig. 3, which are vertically slidable in guide members 30 which are supported by channel bars 31, Figs. 2 and 3, which in turn are supported by the frame 1.

The boxes 29 are respectively supported by flexible means, such as two chains 32, which are respectively supported by two cranks 33 provided respectively at the ends of a transverse horizontal rock shaft 34 oscillatively mounted in bearings 35 supported by the frame 1. The rock shaft 34 has a crank 36 to which is pivoted the forward end of a connecting rod 37, the rear end of which is pivoted to a lever 38 pivoted to the frame 1, and adapted to have locked engagement in the usual manner with a toothed quadrant 39 supported on the frame 1. By pulling the lever 38 rearwardly the boxes 29 may be lifted by means of the rod 37, rock shaft 34 and chains 32.

Respectively encircling the chains 32 are two coil compression springs 40, the lower ends of which respectively bear against the boxes 29, and the upper ends of which bear respectively against the cranks 33. When the lever 38 is thrown forwardly, the cranks 33 will force the springs 40 downwardly, thus forcing downwardly the boxes 29 and with them the extensions 20 and marking wheels 21. By the use of the springs 40, much weight may be eliminated in the wheels 21, while at the same time affording means by which the shoes 26 can make easily seen marks on the ground.

In order that the shaft 17 may be rotated by hand to properly set the wheels 21, without moving the planter, when the wheels 21 have been lifted from the ground, I secure to said shaft 17 a hand wheel 41, Figs. 1, 2 and 3.

For lifting the rear ends of the shoes 4, there is extended through said shoes a transverse bar 42 to which is secured an arm 43, the upper end of which is pivoted to an arm 44 of a bell crank lever 45 pivotally mounted on the rock shaft 34, and the other arm 46 of which is pivoted to the forward end of a rod 47, the rear end of which is pivoted to a lever 48 mounted on the frame 1, and adapted to have locked engagement in the usual manner with a toothed quadrant 49 mounted on the frame 1.

In the operation of my invention, the parts being in the positions shown in the drawings, when the machine is moved forwardly, the marking wheels 21 will be revolved, thereby rotating the shaft 17 and operating the seed dropping mechanism, as already described. At the same time the marking shoes 26 will mark the ground, each marking wheel making two sets of impressions at opposite sides of the wheel. At the ends of the rows planted, the machine is turned around and is drawn in the opposite direction, the shoes 26 of the right wheel 21 being made to travel in the marks made in the ground by the shoes 26 of the right wheel 21, or vice versa, depending upon the turn being made to the right or left at the end of the row. If the shoes 26 do not register with the marks made on the last trip across the field, the lever 38 is operated to lift the wheels 21, and the hand wheel 41 is used to turn the shaft 17, so as to properly position the shoes 26 with such marks. The lever 38 is then thrown forwardly upon which the springs 40 will force the marking wheels 21 downwardly against the ground. The machine may now be moved forwardly across the field in the operation of planting. At any time when the shoes of the checking wheel 21 do not register with the marks with which they are designed to register, the machine is stopped, the lever 38, thrown rearwardly to lift the shaft 17 and the marking wheels 21, and the hand wheel 41 operated to turn the shaft 17 to properly position the marking wheels.

By loosening the set screws 22, the marking wheels 21 may be adjusted toward or from each other on the shaft extensions 20 to correspond with any change of adjustment of the shoes 4 toward or from each other. The usual dropping tubes 50, which are connected in the usual manner with the seed boxes 7 respectively, being flexible, will accommodate themselves to the positions of the shoes 4 in the ordinary manner.

By loosening the set screws 24, the members 23 may be radially adjusted to space apart the pairs of shoes 26 to the distance required between the hills to be planted. As the seed dropping mechanism is dependent upon the revolving of the marking wheels 21 for its operation, the seed will be dropped from the boxes 7 at the proper times, the hills being farther apart when the wheels are expanded, and nearer together when the marking wheels are contracted in diameter and circumference.

The marking wheels 21 are each provided with shoes 26 arranged, as shown, in pairs, for the reason that in drilling, one set of shoe markings may be covered with dirt. For this reason, the shoes of each pair are disposed at opposite sides respectively of the body of the wheel.

I do not limit my invention to the structure shown and described, as many modifications within the scope of the appended claims, may be made without departing from the spirit of my invention.

What I claim is:—

1. In a check rower planter, seed dropping means, a rotary shaft comprising an intermediate portion and two extensions respectively flexibly connected to the ends of said intermediate portion, means actuated by said intermediate portion for operating the seed dropping means, two marking wheels respectively longitudinally adjustably secured to said extensions, resilient means for normally forcing said extensions downwardly, and means for lifting said extensions, substantially as set forth.

2. In a check rower planter, seed dropping means, a rotary shaft comprising an intermediate portion and two extensions flexibly connected therewith, means actuated by said shaft for operating said seed dropping means, two expansible and contractible marking wheels respectively secured to said extensions at opposite sides of said seed dropping means, a rock shaft, means for rocking said rock shaft, means operated by said rock shaft for lifting said extensions, and resilient means for forcing said extensions downwardly, substantially as set forth.

3. In a check rower, seed dropping means, a rotary shaft comprising an intermediate portion and two extensions respectively pivotally connected thereto so as to swing upwardly and downwardly, means actuated by said intermediate portion for operating the seed dropping means, two marking wheels respectively secured to and rotatable with said extensions, a lever, means actuated by the lever for lifting said extensions when the lever is swung in one direction, and resilient means interposed between said lever and said extensions by which the lever when swung in the other direction actuates said resilient means to force said extensions downwardly, substantially as set forth.

4. In a check rower, a frame, a rock shaft pivoted thereon having a crank, a rotary shaft on said frame comprising an intermediate portion and an extension flexibly connected to one end of the intermediate portion, means for oscillating said rock shaft, flexible means connecting said rock shaft and said extension for lifting said extension when the shaft is rocked in one direction, resilient means operated by the rock shaft for forcing the extension downwardly when the rock shaft is rocked in the other direction, and a marking wheel secured to and rotatable with said extension, substantially as set forth.

5. In a check rower, a frame, seed dropping means, a lever pivoted to the frame, a shaft rotatable on said frame comprising an intermediate portion and an extension flexibly connected to one end of said shaft, a bearing vertically movable on said frame in which the extension is rotatably mounted, flexible means connecting said bearing and said lever by which the bearing is lifted when the lever is swung in one direction, resilient means actuated by said lever when the latter is swung in the opposite direction for forcing said extension downwardly, means actuated by the intermediate portion of said shaft for operating said seed dropping mechanism, and a marking wheel secured to and rotatable with said extension, substantially as set forth.

6. In a check rower, a frame, seed dropping means carried thereby, a lever pivoted to said frame, a shaft rotatable on said frame comprising an intermediate portion and an extension flexibly connected to said shaft, means actuated by said intermediate portion for operating said seed dropping means, a rock shaft on said frame having a crank arm, means actuated by said lever for rocking said rock shaft, a bearing vertically movable on said frame and in which said extension is rotatable a marking wheel secured to and rotatable with said extension, flexible means connecting said crank arm and said bearing by which the latter is lifted when the crank arm is moved in one direction, and a spring connecting said crank arm and said bearing by which the latter is depressed when the crank arm is moved in the opposite direction, substantially as set forth.

7. In a check rower, a frame, a rock shaft having a crank arm on said frame, means for rocking said rock shaft, a bearing vertically movable on said frame, means connecting the crank arm and bearing by which the latter is lifted when the rock shaft is rocked in one direction, a coil spring interposed between and bearing against said crank arm and said bearing by which the bearing is forced downwardly when the rock shaft is rocked in the other direction, a shaft rotatable in said bearing and vertically movable therewith, a marking wheel secured to and rotatable with said shaft, and means for rotating said shaft, substantially as set forth.

In testimony whereof I have signed my name to this specification.

SWENEY MUNSON.